Jan. 12, 1926.　　　　W. DREDGE　　　　1,569,009
BAKER'S OVEN
Filed Jan. 24, 1924
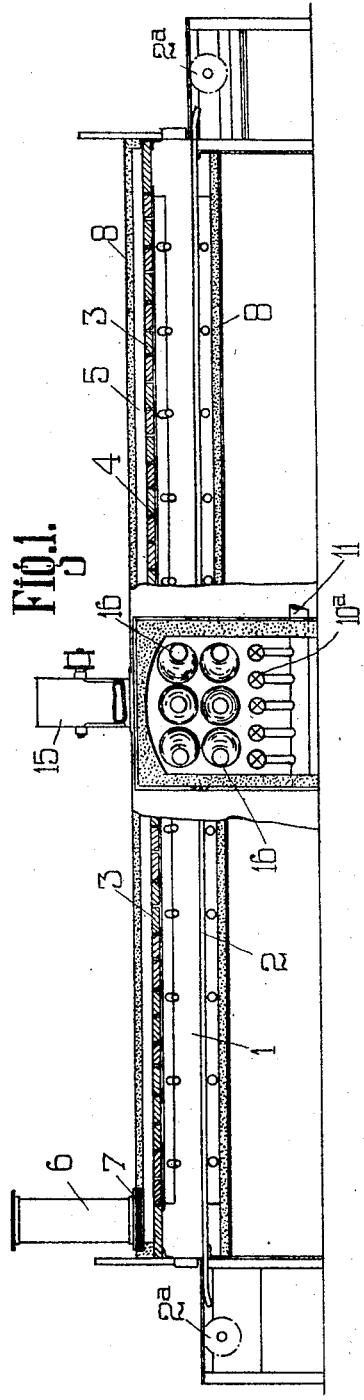
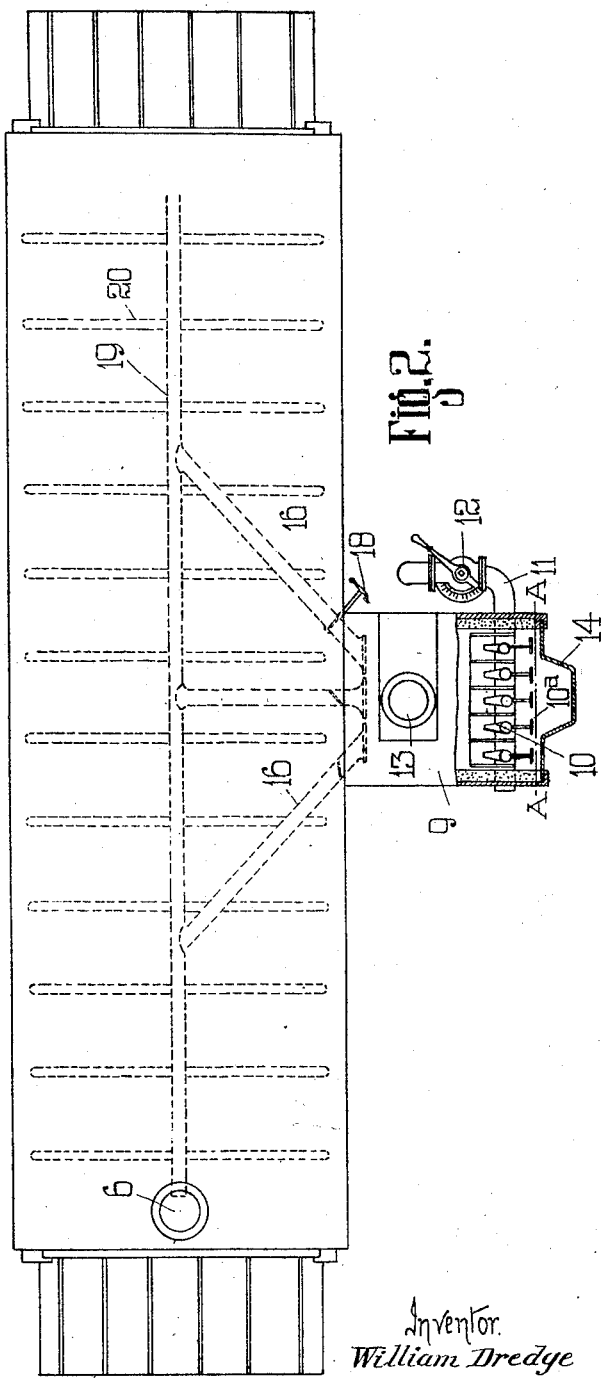
Inventor.
William Dredge
By Dodge and Sons
Associate Attorneys.

Patented Jan. 12, 1926.

1,569,009

UNITED STATES PATENT OFFICE.

WILLIAM DREDGE, OF MANCHESTER, ENGLAND.

BAKER'S OVEN.

Application filed January 24, 1924. Serial No. 688,289.

*To all whom it may concern:*

Be it known that I, WILLIAM DREDGE, a subject of the King of Great Britain, residing in Manchester, in the county of Lancaster and Kingdom of England, have invented certain new and useful Improvements in Bakers' Ovens, of which the following is a specification.

This invention relates to improvements in the heating arrangements of bakers' ovens of the type in which the oven is heated by hot air introduced from an external heating chamber situated close to the oven and heated by gas or oil burners, the heated air being conveyed into the oven chamber by pipes or conduits, and distributed therein by branch distributing pipes which may be perforated or have an open end. The air to be heated has, in some cases, been supplied under pressure to these external heating chambers, and, after heating, is conducted to the oven by pipes provided with controlling valves and distributed in the oven by distributing pipes arranged both above and below the upper run of an endless travelling band on which the goods are carried.

In the construction according to my invention, as applied to a travelling oven, I provide an external heating chamber on the side of the oven, in which chamber air is heated by gaseous fuel burners, and I provide an upper and lower series of separate conduits passing from this heating chamber through the wall of the oven and communicating respectively with an upper and lower series of distributing pipes situated above and below the upper run of travelling conveyor.

The invention will be understood from the following description, reference being had to the accompanying drawings, in which:—

Figure 1 is a sectional elevation of my improved baker's oven; the external air-heating chamber being shown in vertical section on the line A—A of Fig. 2.

Figure 2 is a plan, with the heating-chamber partly in section.

Referring to these figures, which illustrate the invention applied to a baker's oven having an endless travelling conveyor of well known type, 1 is the oven-chamber through which passes the travelling chain-conveyor 2, carried around pulleys or sprockets 2ª at the ends of the oven. The roof of the oven-chamber is shown as formed of perforated tiles 3, supported by metallic T-pieces 4. Through the perforations in these tiles the gases or vapours from the baking-chamber can pass into a flue or collecting chamber 5 extending the whole length and width of the oven and are drawn off through an uptake 6 controlled by a damper 7. 8 is the casing of heat-insulating material.

The external air-heating chamber according to my invention is denoted by 9, and will now be described. 10 are burners, each fitted with a valve controlled by a handle 10ª, and supplied with high pressure gaseous fuel through the conduit 11, the fuel supply being controlled by the valve 12 (Fig. 2). At the top of the heating-chamber 9 is an outlet or uptake 13 controlled by a damper.

The heating-chamber may be located at a lower level than the baking-chamber, so that the heated air and combustion-products will rise and flow through conduits into the baking chamber 1, or means may be provided for inducing (by suction or pressure) the heated air and combustion products to flow from the heating-chamber into the oven-chamber. In the construction illustrated air is admitted to the heating-chamber through an opening in front, controlled by a vertically sliding door 14, which can be raised as required to admit additional air. 15 is a fan located in a casing at the top of the heating-chamber for forcing in air to effect complete combustion.

The air heated in the heating-chamber 9 and the products of combustion are conveyed into the oven-chamber 1 by a number of main conduits 16, each provided with a damper or regulating valve, fitted with an operating handle or lever and an indicator, as denoted at 18. These main conduits 16 join a main distributing conduit 19 extending longitudinally in the oven, and the heated air is distributed to all parts of the oven-chamber by branch pipes 20. These branch pipes, which may be perforated or have open ends only, may extend across the oven-chamber at right angles, as shown, or at any other desired angle. The branch pipes 20 extend close up to the side walls of the oven so that the heat will be deflected on the biscuits from the oven walls. It will be noted from the drawing that two sets of main conduits and distributing pipes are provided, one in the top part of the oven chamber, and the other set below the travelling conveyor.

A gauge is provided in connection with the heating-chamber by the aid of which an attendant can ascertain that the desired temperature is being maintained so that the heat discharged therefrom is of known temperature. As the heat from the heating chamber is distributed uniformly by the main conduits and the branch ones throughout the baking chamber, it will be readily understood that the distribution of the heat is uniform and this distributing can be regulated to a nicety by adjusting the valves in the conduits 16, or regulating the size of the conduits so that more heat is delivered to that part of the baking chamber which it is desired should be the hottest or the entire baking chamber can be maintained at an equable temperature. It will thus be understood that the difficulty that has arisen through burner tubes located in the baking chamber itself, burning more gas at one end than at the other end, is altogether avoided because by my invention the conduits deliver an equable heat to all parts of the baking chamber, the temperature of the heated air and combustion products delivered by one conduit being the same as the temperature of the air and combustion products delivered by the other conduits because they all obtain their heat from one common source, viz, the heating chamber.

I declare that what I claim is:—

1. Heating arrangements for bakers' ovens of the type containing an endless travelling conveyor, comprising, in combination, an air-heating chamber on the side of the oven; a plurality of gaseous fuel burners in said chamber; means for supplying high pressure combustible gas to the burner-nozzles; means for admitting and forcing air into the heating-chamber; conduits passing through the wall of the heating-chamber for introducing the heated air and products of combustion into the oven; means for controlling said conduits; and distributing pipes connected to the said conduits and arranged to distribute the heated air and products of combustion on both sides of the travelling conveyor.

2. Heating arrangements for bakers' ovens of the type containing an endless travelling conveyor, comprising, in combination, an external heating-chamber on the side of the oven in which air is heated by a plurality of gaseous fuel burners, and means for introducing and distributing the heated air and products of combustion on both sides of the conveyor, comprising an upper and lower series of conduits passing from the heating-chamber through the wall of the oven and communicating respectively with an upper and lower series of distributing pipes situated above and below the upper run of the conveyor.

In witness whereof, I have hereunto signed my name this 7th day of January 1924.

WILLIAM DREDGE.